United States Patent

Kobayashi et al.

Patent Number: 5,681,914
Date of Patent: Oct. 28, 1997

[54] CURABLE SILICONE COMPOSITION

[75] Inventors: Hideki Kobayashi; Toru Masatomi, both of Chiba Prefecture, Japan

[73] Assignee: Dow Corning Toray Silicone Co., Ltd., Tokyo, Japan

[21] Appl. No.: 653,734

[22] Filed: May 23, 1996

[30] Foreign Application Priority Data

May 25, 1995 [JP] Japan .................... 7-151005

[51] Int. Cl.$^6$ .................................................. C08G 77/06
[52] U.S. Cl. .......................... 528/18; 528/33; 528/36; 528/42
[58] Field of Search ............................ 528/33, 18, 36, 528/42

[56] References Cited

U.S. PATENT DOCUMENTS 3,175,993  3/1965  Weyenberg .......................... 260/46.5

FOREIGN PATENT DOCUMENTS

| 51-148749 | 12/1976 | Japan . |
| 58-172245 | 10/1983 | Japan . |
| 03265581 | 11/1991 | Japan . |
| 2067212 | 7/1981 | United Kingdom . |

*Primary Examiner*—Karen A. Dean
*Attorney, Agent, or Firm*—Roger H. Borrousch

[57] ABSTRACT

A curable silicone composition that cures at room temperature into a highly water-repellent, highly oil-repellent film is obtained from a composition of (A) an organopolysiloxane resin with the following average unit formula $$R_a(ZO)_b SiO_{(4-a-b)/2}$$

in which R represents substituted and unsubstituted monovalent hydrocarbon groups, Z is a hydrogen atom or $C_1$ to $C_6$ alkyl group, i has a value from 0.80 to 1.80, and b has a value that gives a content of 0.01 to 10 weight % silicon-bonded hydroxyl or alkoxy in the instant compound; (B) an organopolysiloxane each molecule of which contains at least one silylalkylene group with the following general formula bonded to main-chain silicon $$-R^1-SiR^2_{(3-m)}X_m$$

wherein $R^1$ represents alkylene and alkyleneoxyalkylene groups; each $R^2$ is a group independently selected from the set consisting of alkyl groups, aryl groups, and the 3,3,3-trifluoropropyl group; X is a halogen atom or, alkoxy group; and m is an integer from 1 to 3, and each molecule of organopolysiloxane (B) contains at least one fluorine-containing organic group with the following general formula bonded to main-chain silicon $$-R^1-C_n F_{(2n+1)}$$

wherein $R^1$ is defined as above and n is an integer with a value of at least 4; (C) an organosilane with the general formula $$R_c SiY_{4-c}$$

R represents substituted and unsubstituted monovalent hydrocarbon groups, Y is a hydrolyzable group, and c is an integer from 0 to 2 or the partial hydrolysis and condensation product thereof; and (D) a cure-accelerating catalyst.

2 Claims, No Drawings

5,681,914

1

CURABLE SILICONE COMPOSITION

BACKGROUND OF THE INVENTION

1. Field of the Invention

This invention relates to curable silicone compositions. More particularly, this invention relates to a curable silicone composition that forms a highly water-repellent and highly oil-repellent cured coating.

2. Description of the Prior Art

Japanese Patent Application Laid Open (Kokai) Number Sho 51-148749 (1976) teaches an example of silicone compositions that cure at room temperature with the formation of a coating or film. The composition therein disclosed comprises organopolysiloxane resin and two different alkoxysilanes. In the area of silicone compositions that form water-repellent cured films, United Kingdom Patent No. 2,067,212, published Jul. 22, 1981, (Japanese Patent Kokai Number Sho 55-48245, 1980) discloses a composition comprising organopolysiloxane resin, alpha,omega-dihydroxydiorganosiloxane, and organosilane. However, the cured films afforded by these compositions do not evidence a satisfactory water- and oil-repellency, and these compositions therefore cannot be used in applications where higher levels of water repellency and oil repellency are critical considerations.

SUMMARY OF THE INVENTION

Problems to Be Solved by the Invention

The inventors achieved the present invention as a result of extensive investigations directed to solving the problems described above.

The object of the present invention is a curable silicone composition that cures at room temperature into a highly water-repellent, highly oil-repellent film.

Means Solving the Problems and Function Thereof

The present invention relates to a curable silicone composition comprising (A) 100 weight parts organopolysiloxane resin with the following average unit formula $$R_a(ZO)_b SiO_{(4-a-b)/2}$$

in which R represents substituted and unsubstituted monovalent hydrocarbon groups, Z is a hydrogen atom or $C_1$ to $C_6$ alkyl group, a has a value from 0.80 to 1.80, and b has a value that gives a content of 0.01 to 10 weight % silicon-bonded hydroxyl or alkoxy in the instant compound;

(B) 0.5 to 500 weight parts organopolysiloxane each molecule of which contains at least one silylalkylene group with the following general formula bonded to a main-chain silicon atom

wherein $R^1$ represents alkylene and alkyleneoxyalkylene groups; each $R^2$ is a group independently selected from the group consisting of alkyl groups, aryl groups, and the 3,3,3-trifluoropropyl group; X is a halogen atom or alkoxy group; and m is an integer from 1 to 3, and each molecule of organopolysiloxane (B) contains at least one fluorine-containing organic group with the following general formula bonded to a main-chain silicon atom

2 wherein $R^1$ is defined as above and n is an integer with a value of at least 4;

(C) 1 to 90 weight parts organosilane with the general formula

or the partial hydrolysis and condensation product thereof; R represents substituted and unsubstituted monovalent hydrocarbon groups, Y is a hydrolyzable group, and c is an integer from 0 to 2; and (D) a cure-accelerating catalyst in sufficient quantity to cure the composition.

DETAILED DESCRIPTION OF THE PREFERRED EMBODIMENTS

The organopolysiloxane resin used as component (A) in the present invention is described by the average unit formula given above. R in the said formula represents substituted and unsubstituted monovalent hydrocarbon groups and is exemplified by alkyl groups such as methyl, ethyl, propyl, tert-butyl, 2-ethylhexyl, dodecyl, octadecyl, and the like; alkenyl groups such as vinyl, allyl, and the like; aryl groups such as phenyl, naphthyl, and the like; and substituted alkyl groups such as chloromethyl, 3,3,3-trifluoropropyl, 3,3,4,4,5,5,5-heptafluoropentyl, difluoromonochloropropyl, and so forth. Alkyl and alkenyl are preferred among the preceding, and the methyl group is particularly preferred. Z is the hydrogen atom or a $C_1$ to $C_6$ alkyl group wherein said alkyl is exemplified by methyl, ethyl, propyl, and butyl. The group represented by ZO will therefore be the hydroxyl group or an alkoxy group. The subscript a is a number from 0.80 to 1.80, and the subscript b has a value that gives a content of 0.01 to 10 weight % and preferably 0.05 to 5 weight % silicon-bonded hydroxyl or alkoxy in the instant compound. The described organopolysiloxane resin constituting component (A) can be prepared, for example, by subjecting an organochlorosilane mixture having 0.80 to 1.80 monovalent hydrocarbon groups per silicon atom to hydrolysis in organic solvent followed by condensation. In addition, heating the organopolysiloxane resin thus prepared will yield organopolysiloxane resin in which part of the silanol groups have been condensed. The said organochlorosilane mixture is exemplified by mixtures of methyltrichlorosilane and dimethyldichlorosilane, which may also contain trimethylchlorosilane or tetrachlorosilane. The chlorosilane may in part be replaced with alkoxysilane.

The organopolysiloxane (B) used in the present invention is the component that characterizes the present invention. Each molecule of organopolysiloxane (B) contains at least one silylalkylene group with the general formula —$R^1$—$SiR^2_{(3-m)}X_m$ bonded to a main-chain silicon atom and at least one fluorine-containing organic group with the general formula —$R^1$—$C_nF_{(2n+1)}$ bonded to a main-chain silicon atom. $R^1$ in the preceding formulas represents alkylene and alkyleneoxyalkylene groups. Said alkylene groups are exemplified by ethylene, methylethylene, ethylethylene, propylethylene, butylethylene, propylene, butylene, 1-methylpropylene, pentylene, hexylene, heptylene, octylene, nonylene, and decylene. The said alkyleneoxyalkylene groups are exemplified by ethyleneoxyethylene, ethyleneoxypropylene, ethyleneoxybutylene, propyleneoxyethylene, propyleneoxypropylene, propyleneoxybutylene, butyleneoxyethylene, and butyleneoxypropylene. Each $R^2$ is a group independently selected from the set consisting of alkyl groups, aryl groups, and the 3,3,3-trifluoropropyl group. These alkyl groups are exemplified by methyl, ethyl, propyl, butyl, pentyl, hexyl, heptyl, octyl, nonyl, decyl, hexadecyl, and octadecyl. The said aryl groups are exemplified by phenyl, tolyl, and xylyl. X is a halogen atom or alkoxy group, wherein the halogen atom is exemplified by fluorine, chlorine, and bromine and the alkoxy group is exemplified by methoxy, ethoxy, propoxy, butoxy, and methoxyethoxy. The subscript B is an integer from 1 to 3, and the subscript n is an integer with a value of at least 4 and preferably with a value of 4 to 12. The fluorine-containing organic group with the formula given above is exemplified by nonafluorohexyl, tridecafluoroisooctyl, tridecafluorooctyl, heptadecafluorodecyl, nonafluorobutylethyloxyethyl, nonafluorobutylethyloxypropyl, nonafluorobutylethyloxybutyl, undecafluoropentylethyloxyethyl, and undecafluoropentylethyloxypropyl. The silylalkylene group and fluorine-containing organic group with the above-described formulas may be bonded in molecular chain terminal or non-terminal position or in both positions. The silicon-bonded groups other than the preceding are exemplified by monovalent hydrocarbon groups and are specifically exemplified by the groups provided above as exemplary of $R^2$. The organopolysiloxane constituting the main chain is preferably straight chain, but a portion may be branched, cyclic, or network. This organopolysiloxane is preferably a liquid at ambient temperatures, and its viscosity at 25° C. is preferably from 0.000005 to 0.1 $m^2/2$. A single organopolysiloxane as described above or a mixture of two or more different organopolysiloxanes as described above may be used as this component.

The organopolysiloxane (B) preferably has the following general formula

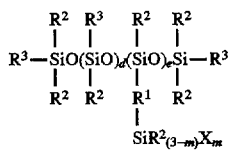

in which each $R^3$ is independently selected from the group consisting of alkyl groups, aryl groups, the 3,3,3-trifluoropropyl group, and fluorine-containing organic groups with the general formula $—R^1—C_nF_{(2n+1)}$ with the proviso that at least one $R^3$ is a fluorine-containing organic group with the given formula. These alkyl, aryl, and fluorine-containing organic groups are exemplified by the same groups as above. Moreover, $R^1$, $R^2$, X, m, and n are also defined as above. The subscript d is an integer from 1 to 10,000 and preferably from 1 to 1,000, and the subscript e is an integer from 1 to 1,000 and preferably from 1 to 100.

The organopolysiloxanes defined by the preceding general formula are specifically exemplified by the following compounds:

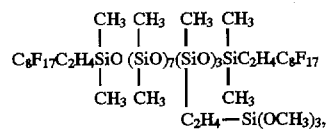

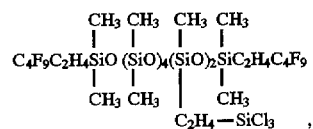

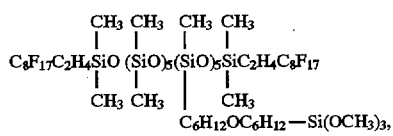

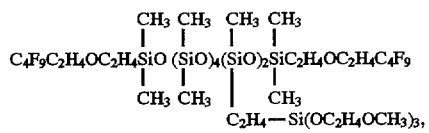

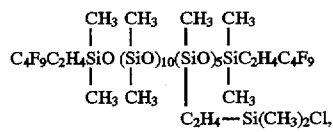

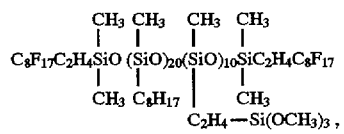

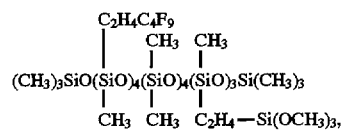

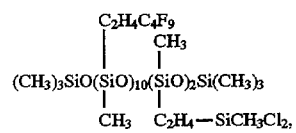

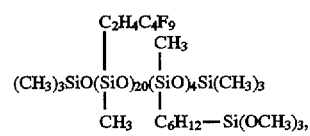

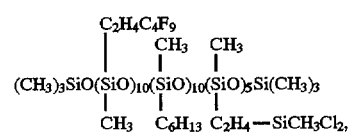

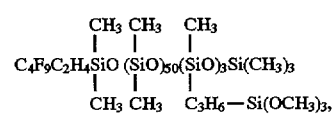

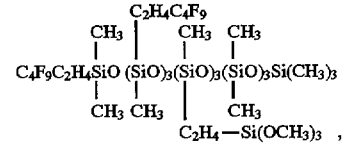

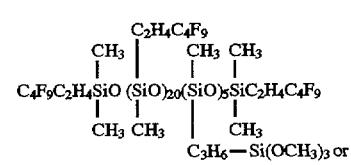

-continued

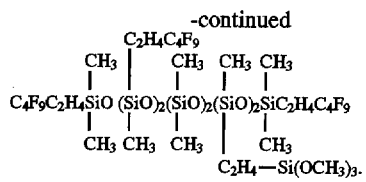

Organopolysiloxanes with the preceding general formula can be prepared, for example, by equilibration polymerization in the presence of an acid or base catalyst among (1) disiloxane with the general formula $(R^3R^2{}_2Si)_2O$, (2) cyclosiloxane with the general formula $(R^5R^2SiO)_f$, and (3) cyclosiloxane with the general formula $(R^3R^2SiO)_g$ followed by addition reaction in the presence of hydrosilylation catalyst with (4) silane with the general formula $H-SiR^2{}_{(3-m)}X_m$; or by equilibration polymerization in the presence of acid catalyst among (1) disiloxane with the general formula $(R^3R^2{}_2Si)_2O$, (2') cyclosiloxane with the general formula $(HR^2SiO)_f$, and (3) cyclosiloxane with the general formula $(R^3R_2SiO)_g$ followed by addition reaction in the presence of hydrosilylation catalyst with (4') silane with the general formula $R^5-SiR^2{}_{(3-m)}X_m$.

$R^2$, $R^3$, X, and m in the preceding formulas are defined as above. $R^5$ represents alkenyl and alkenyloxyalkyl groups, wherein said alkenyl is exemplified by vinyl, allyl, butenyl, pentenyl, hexenyl, heptenyl, octenyl, nonenyl, and decenyl and said alkenyloxyalkyl is exemplified by ethenyloxyethyl, ethenyloxypropyl, ethenyloxybutyl, 2-propenyloxyethyl, 2-propenyloxypropyl, 2-propenyloxybutyl, 3-butenyloxyethyl, and 3-butenyloxypropyl. The subscripts f and g are each integers from 3 to 20.

In addition to siloxanes as defined by the general formula given above, the following, for example, can also be used as organopolysiloxane (B):

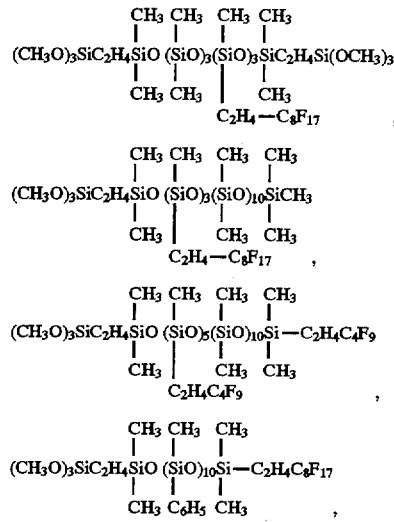

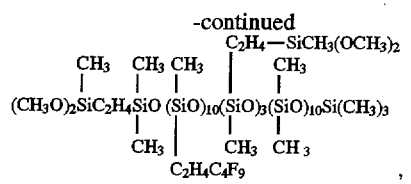

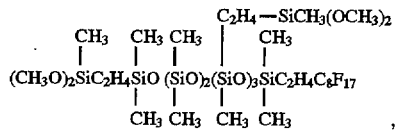

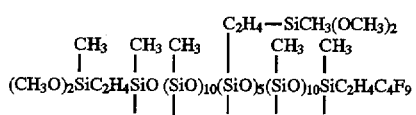

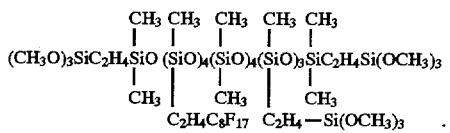

Component (B) is added at from 0.5 to 500 weight parts and preferably at from 0.5 to 100 weight parts, in each case per 100 weight parts component (A). The ultimately obtained cured coating will have an unacceptable water- and oil-repellency when less than 0.5 weight part component (B) is added. On the other hand, additions in excess of 500 weight parts cause the ultimately obtained cured coating to be soft and have an unsatisfactory durability.

The organosilane with the general formula given above or partial hydrolysis condensate thereof used as component (C) in the present invention functions to cure the composition according to the present invention. R in the given formula represents substituted and unsubstituted monovalent hydrocarbon groups and is exemplified by the same groups as above. Y in the given formula represents a hydrolyzable group and is exemplified by diorganoketoxime groups such as dimethyl ketoxime, methyl ethyl ketoxime, and the like; alkoxy groups such as methoxy, ethoxy, and the like; acyloxy groups such as acetoxy and the like; organoamino groups such as N-butylamino and the like; organoacylamido groups such as methylacetamido and the like; N,N-diorganohydroxyamino groups such as N,N-diethylhydroxyamino and the like; and the propenoxy group. The subscript c is an integer from 0 to 2 and is preferably 1. This component make take the form of a single such organosilane or partial hydrolysis condensate thereof or a mixture of two or more selections. This component is added at from 1 to 90 weight parts and preferably at from 1 to 60 weight parts, in each case per 100 weight parts component (A).

The cure-accelerating catalyst (D) employed in the present invention is used to accelerate the cure of the composition according to the present invention. Condensation reaction-accelerating catalysts typically used for the dehydration condensation of silanol groups are operable as this cure-accelerating catalyst. Specific examples here are the tin salts of carboxylic acids such as dibutyltin diacetate, dibutyltin dilaurate, dibutyltin dioctoate, stannous octoate, stannous naphthenate, stannous oleate, stannous isobutyrate, stannous linoleate, stannous stearate, stannous benzoate, stannous naphthoate, stannous laurate, stannous o-thymotate, stannous beta-benzoylpropionate, stannous crotonate, stannous tropate, stannous p-bromobenzoate, stannous palmitoleate, stannous cinnamate, stannous phenylacetate, and so forth; the iron salts, manganese salts, and cobalt salts of the preceding carboxylic acids; and the tetraalkyl titanates, complex salts of dialkyl titanates, organosiloxytitanates, and so forth. This component should be added in sufficient quantity to cure the composition according to the present invention, and will ordinarily be added at from 0.0001 to 10 weight parts per 100 weight parts component (A).

While the composition according to the present invention comprises the components (A) to (D) described above, it may also contain a silane coupling agent, such as those with the formulas given below, in order to improve the adherence for various substrates:

$NH_2CH_2CH_2Si(OC_2H_5)_3$, $NH_2CH_2CH_2NH(CH_2)_3Si(OCH_3)_3$, $CH_2=CHSi(OCH_3)_3$, $CH_2=CHSi(OC_2H_5)_3$, $CH_2=CHSi(OOCCH_3)_3$, or $HS(CH_2)_3Si(OCH_3)_3$.

A single silane coupling agent or a mixture of two or more different silane coupling agents may be used. The quantity of addition for this component is preferably from 0.01 to 10 weight % based on the composition according to the present invention.

The composition according to the present invention can be prepared by mixing the above-described components (A) to (D) to homogeneity while excluding moisture. The mixing sequence is not critical. However, when the organopolysiloxane resin (A) is a solid, this component is preferably dissolved in organic solvent and the resulting solution mixed with the other components. Organic solvents usable for this purpose are exemplified by aromatic solvents such as benzene, toluene, xylene, and so forth; alicyclic solvents such as cyclohexane, methylcyclohexane, dimethylcyclohexane, and so forth; chlorinated solvents such as trichloroethylene, 1,1,1-trichloroethane, carbon tetrachloride, chloroform, and so forth; saturated aliphatic hydrocarbon solvents such as hexane, industrial gasoline, and so forth; ethers such as diethyl ether, tetrahydrofuran, and so forth; ketones such as methyl isobutyl ketone, and so forth; fluorinated solvents such as alpha,alpha,alpha-trifluorotoluene, hexafluoroxylene, and so forth; and volatile silicones such as hexamethyldisiloxane, hexamethylcyclotrisiloxane, octamethylcyclotetrasiloxane, and so forth.

The composition according to the present invention is preferably used diluted with organic solvent, and organic solvents operable for this purpose are exemplified by the solvents already given above.

The composition according to the present invention as described above can be stored for long periods of time in the absence of moisture. The composition will cure at room temperature in the presence of moisture to form a coating or film that exhibits an excellent water- and oil-repellency, an excellent resistance to staining or fouling, and an excellent resistance to heat, weathering, and chemicals. The cure of the instant composition can be accelerated by heating. The composition according to the present invention is therefore highly qualified for use in various applications where the aforementioned properties are required, for example, as an inhibitor of the adhesion of water drops, snow, and ice, as an antistaining coating, or as a release or mold-release coating.

The invention will be explained in greater detail below through working examples. The water repellency of the cured coatings was evaluated through the contact angle with water and the sliding angle by water. The oil repellency was evaluated through the contact angle with n-hexadecane. The contact angles were measured as follows: using a microsyringe water or n-hexadecane was dripped at 20° C. onto the cured coating at 10 locations; the corresponding contact angles were measured using a contact angle meter from Kyowa Kaimen Kagaku Kabushiki Kaisha; and these values were averaged to give the contact angle for the cured coating. The water sliding angle was measured as follows: water was dripped as above onto the cured coating at 5 locations; the corresponding sliding angles of these water drops were measured using a liquid drop sliding angle meter from Erma Inc.; and these values were averaged to give the sliding angle of the cured coating.

SYNTHESIS EXAMPLE 1

The following were introduced into a flask and stirred for 7 hours while heating at 65° C.: 82.1 g of the disiloxane $(C_8F_{17}C_2H_4(CH_3)_2Si)_2O$, 51.8 g of the cyclosiloxane $((CH_3)_2SiO)_4$, 18 g of the cyclosiloxane $(H(CH_3)SiO)_4$, and 0.07 g trifluoromethanesulfonic acid. This was followed by neutralization with sodium bicarbonate, filtration, and elimination of the small amount of volatile material by stirring for 3 hours at 170° C. under reduced pressure. To the resulting reaction solution was added isopropanolic chloroplatinic acid solution (chloroplatinic acid concentration=3 weight %) in sufficient quantity to provide 80 weight-ppm of platinum metal. This was followed by heating to 60° C. and the gradual dropwise addition of 44.4 g (0.3 mol) vinyltrimethoxysilane. The reaction was continued for 4 hours at 110° C. after the completion of the addition. The small amount of volatile material was subsequently distilled off to yield a liquid reaction product. 162 g of reaction product was recovered for a yield of 82%. Analysis of this reaction product by Fourier-transform infrared absorption analysis (FT-IR), $^{29}Si$ nuclear magnetic resonance analysis ($^{29}Si$-NMR), and $^{13}C$ nuclear magnetic resonance analysis ($^{13}C$-NMR) confirmed it to be organopolysiloxane with the following formula.

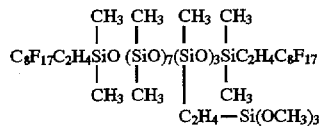

SYNTHESIS EXAMPLE 2

The following were introduced into a flask and stirred for 7 hours while heating at 65° C.: 13 g of the disiloxane $((CH_3)_3Si)O_2$, 29.6 g of the cyclosiloxane $((CH_3)_2SiO)_4$, 121.6 g of the cyclosiloxane $(C_4F_9C_2H_4(CH_3)SiO)_4$, 22.5 g of the cyclosiloxane $(H(CH_3)SiO)_4$, and 0.07 g trifluoromethanesulfonic acid. This was followed by neutralization with ammonium carbonate, filtration, and elimination of the small amount of volatile material by stirring for 3 hours at 170° C. under reduced pressure. To the resulting reaction solution was added isopropanolic chloroplatinic acid solution (chloroplatinic acid concentration=3 weight %) in sufficient quantity to provide 80 weight-ppm of platinum metal. This was followed by heating to 60° C. and the gradual dropwise addition of 44.4 g (0.3 mol) vinyltrimethoxysilane. The reaction was continued for 4 hours at 110° C. after the completion of the addition. The small amount of volatile material was subsequently distilled off to yield a liquid reaction product. 181 g of reaction product was recovered for a yield of 80%. Analysis of this reaction product by FT-IR, $^{29}$Si-NMR, and $^{13}$C-NMR confirmed it to be organopolysiloxane with the following formula.

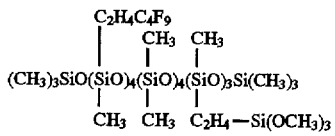

EXAMPLE 1

27.9 g of a methylpolysiloxane resin (silicon-bonded hydroxyl content=0.9 weight %) composed of 80 mole % methylsiloxane units and 20 mole % dimethylsiloxane units was dissolved in 80 g toluene. A curable silicone composition was then prepared by adding the following to this toluene solution with mixing to homogeneity (the operations were carried out under nitrogen): 1 g of the organopolysiloxane whose synthesis is described in Synthesis Example 1, 10.4 g methyltri(methyl ethyl ketoximo)silane, and 0.6 g dibutyltin diacetate. The silicone composition thereby obtained was applied on the surface of a smooth, flat glass plate using a spin coater and was then cured by standing for 24 hours at room temperature. Measurement of the contact angles for the resulting coating gave the following results: contact angle against water=105.5°; contact angle against n-hexadecane=48°. The sliding angle for water was 28°.

COMPARATIVE EXAMPLE 1

A curable silicone composition was prepared and cured as in Example 1, but in this case omitting the organopolysiloxane from Synthesis Example 1 that was used in Example 1. Measurement of the contact angles for the resulting coating gave the following results: contact angle against water=101°; contact angle against n-hexadecane=32°. The sliding angle for water was 28°.

EXAMPLE 2

27.9 g of a methylpolysiloxane resin (silicon-bonded hydroxyl content=0.9 weight %) composed of 80 mole % methylsiloxane units and 20 mole % dimethylsiloxane units was dissolved in 80 g toluene. A curable silicone composition was then prepared by adding the following to this toluene solution with mixing to homogeneity (the operations were carried out under nitrogen): 1 g of the organopolysiloxane whose synthesis is described in Synthesis Example 2, 10.4 g methyltri(methyl ethyl ketoximo) silane, and 0.6 g dibutyltin diacetate. The silicone composition thereby obtained was applied on the surface of a smooth, flat glass plate using a spin coater and was then cured by standing for 24 hours at room temperature. Measurement of the contact angles for the resulting coating gave the following results: contact angle against water=107°; contact angle against n-hexadecane=50°. The sliding angle for water was 25°.

EXAMPLE 3

10 g of a methylpolysiloxane resin (silicon-bonded hydroxyl content=1.5 weight %) composed of 90 mole % methylsiloxane units and 10 mole % dimethylsiloxane units was dissolved in a mixed solvent of 10 g toluene and 70 g xylene hexafluoride. A curable silicone composition was then prepared by adding the following to this solution with mixing to homogeneity (the operations were carried out under nitrogen): 1 g of the organopolysiloxane whose synthesis is described in Synthesis Example 2, 7.3 g methyltrimethoxysilane, 1 g 3-(2'-aminoethyl) aminopropyltrimethoxysilane, and 1 g dibutyltin dilaurate. The silicone composition thereby obtained was applied on the surface of a smooth, flat glass plate using a spin coater and was then cured by standing for 24 hours at room temperature. Measurement of the contact angles for the resulting coating gave the following results: contact angle against water=107°; contact angle against n-hexadecane= 59°. The sliding angle for water was 23°.

Effects of the Invention

Because the curable silicone composition according to the present invention comprises the components (A) to (D) as described above, and in particular because it contains the organopolysiloxane (B) that carries both silylalkylene and a specific class of fluorinated organic groups, the said composition is characteristically able to cure at room temperature to form a highly water-repellent and highly oil-repellent coating.

That which is claimed is:

1. A curable silicone composition comprising
   (A) 100 weight parts organopolysiloxane resin with the following average unit formula

in which R represents substituted and unsubstituted monovalent hydrocarbon groups, Z is a hydrogen atom or a $C_1$ to $C_6$ alkyl group, a has a value from 0.80 to 1.80, and b has a value that gives a content of 0.01 to 10 weight % silicon-bonded hydroxyl or alkoxy in the instant compound;

(B) 0.5 to 500 weight parts organopolysiloxane each molecule of which contains at least one silylalkylene group with the following general formula bonded to a main-chain silicon atom

wherein $R^1$ represents alkylene and alkyleneoxyalkylene groups; each $R^2$ is a group independently selected from the group consisting of alkyl groups, aryl groups, and the 3,3,3-trifluoropropyl group; X is a halogen atom or alkoxy group; and m is an integer from 1 to 3, and each molecule of organopolysiloxane (B) contains at least one fluorine-containing organic group with the following general formula bonded to a main-chain silicon atom

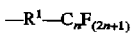

wherein $R^1$ is defined as above and n is an integer with a value of at least 4;

(C) 1 to 90 weight parts organosilane with the general formula

or the partial hydrolysis and condensation product thereof; wherein R represents substituted and unsubstituted monovalent hydrocarbon groups, Y is a hydrolyzable group, and c is an integer from 0 to 2, and (D) a cure-accelerating catalyst in sufficient quantity to cure the composition.

2. The curable silicone composition of claim 1 in which component (B) is an organopolysiloxane having the following general formula

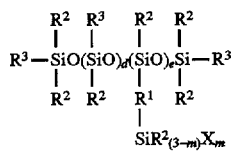

wherein $R^1$ represents alkylene and alkyleneoxyalkylene groups; each $R^2$ is a group independently selected from the set consisting of alkyl groups, aryl groups, and the 3,3,3-trifluoropropyl group; each $R^3$ is independently selected from the group consisting of alkyl groups, aryl groups, the 3,3,3-trifluoropropyl group, and fluorine-containing organic groups with the general formula $-R^1-C_nF_{(2n+1)}$ in which $R^1$ is defined as above and n is an integer with a value of at least 4, with the proviso that at least one $R^3$ is a fluorine-containing organic group with the given formula; X is a halogen atom or alkoxy group; d is an integer from 1 to 10,000; e is an integer from 1 to 1,000; and m is an integer from 1 to 3.

* * * * *